United States Patent [19]
Moore et al.

[11] Patent Number: 6,112,244
[45] Date of Patent: Aug. 29, 2000

[54] METHOD AND APPARATUS IN A WIRELESS COMMUNICATION SYSTEM FOR COMPRESSING AND DECOMPRESSING MESSAGES GENERATED BY A PLURALITY OF APPLICATIONS

[75] Inventors: Morris Anthony Moore, Southlake; Gregory Lewis Cannon, Keller, both of Tex.

[73] Assignee: Motorola, Inc., Schaumburg, Ill.

[21] Appl. No.: 09/032,159

[22] Filed: Feb. 27, 1998

[51] Int. Cl.[7] .................................................. G06F 13/00
[52] U.S. Cl. ............................................................ 709/228
[58] Field of Search ..................................... 709/200, 201, 709/202, 203, 206, 217, 218, 219, 226, 227, 228, 229

[56] References Cited

U.S. PATENT DOCUMENTS

| | | | |
|---|---|---|---|
| 5,387,981 | 2/1995 | Orlen et al. | 358/400 |
| 5,426,426 | 6/1995 | Hymel | 340/825.44 |
| 5,557,749 | 9/1996 | Norris | 709/228 |
| 5,566,001 | 10/1996 | Saidi et al. | 358/426 |
| 5,754,864 | 5/1998 | Hill | 395/712 |
| 5,761,649 | 6/1998 | Hill | 705/27 |

*Primary Examiner*—Moustafa M. Meky
*Attorney, Agent, or Firm*—R. Louis Breeden

[57] ABSTRACT

A server (112) sends (604) selected codebooks (226) and application identifiers (228) to be associated with the codebooks, to a client (122) in preparation for communicating messages. The client receives and stores (606) the selected codebooks and application identifiers. Subsequently, the server, in response to having a message to send to the client, compresses (708) the message according to a codebook associated with an application generating the message, and transmits (710) the message and an application identifier to the client. The client, in response to receiving the message and the application identifier, identifies (714), from the application identifier, the application to receive the message and, hence, the codebook associated with the application, to use for decompressing the message. The client then decompresses (716) the message according to the codebook.

21 Claims, 4 Drawing Sheets

METHOD AND APPARATUS IN A WIRELESS COMMUNICATION SYSTEM FOR COMPRESSING AND DECOMPRESSING MESSAGES GENERATED BY A PLURALITY OF APPLICATIONS

FIELD OF THE INVENTION

This invention relates in general to wireless communication systems, and more specifically to a method and apparatus for communicating messages generated by a plurality of applications utilizing compression codebooks associated with the applications.

BACKGROUND OF THE INVENTION

Many client/server applications that might be supported over a wireless link have "dialects" that are application specific and which offer an opportunity for tokenized communication between the client and server to reduce communication overhead. There are many different types of compression/decompression techniques which are based upon a content-specific codebook of one form or another.

In order to decompress a compressed message sent to the client by an application in the server, the client must have a copy of the codebook utilized by the application for compressing the message. When necessary, different codebooks can be applied to server-to-client communications as compared to those applied to client-to-server communications. In a wireless messaging system, however, it would be prohibitively wasteful of air time to transmit a codebook whenever an application has a message to send somewhere. Furthermore, every client in the wireless messaging system does not necessarily require communications with every application supported by the server.

Thus, what is needed is a method and apparatus in a wireless messaging system for supporting application-specific compression/decompression techniques without expending an unnecessarily large amount of air time in the process. The method and apparatus preferably also will limit the distribution of codebooks in accordance with client needs.

SUMMARY OF THE INVENTION

An aspect of the present invention is a method in a wireless communication system for communicating messages generated by a plurality of applications, some of the plurality of applications having an application identifier which can be associated with one of a plurality of codebooks for compressing and decompressing the messages. The method comprises in a server the step of sending selected ones of the plurality of codebooks, along with selected application identifiers to be associated with the plurality of codebooks, to a client in preparation for communicating the messages; and in the client the step of receiving and storing the selected ones of the plurality of codebooks and the selected application identifiers in preparation for communicating the messages. The method subsequently comprises in the server, in response to having a message to send to the client, the steps of compressing the message according to a codebook associated with an application generating the message; and transmitting, to the client, the message and the application identifier of the application. In addition, the method subsequently comprises in the client, in response to receiving the message and the application identifier, the steps of identifying, from the application identifier, the application to receive the message and, hence, the codebook associated with the application, to use for decompressing the message; and processing the message according to the codebook, to decompress the message.

Another aspect of the present invention is a server in a wireless communication system for communicating messages generated by a plurality of applications, some of the plurality of applications having an application identifier which can be associated with one of a plurality of codebooks for compressing and decompressing the messages. The server comprises a processing system comprising a processor for processing the messages, and a storage element for storing the messages and further for storing the plurality of applications and the plurality of codebooks. The server further comprises a wireless communication interface coupled to the processing system for communicating the messages to and from a client. The processing system is programmed to send selected ones of the plurality of codebooks, along with selected application identifiers to be associated with the plurality of codebooks, to the client in preparation for communicating the messages. The processing system is further programmed, in response to having a message to send to the client, to compress the message according to a codebook associated with an application generating the message, and to transmit the message and the application identifier of the application to the client.

Another aspect of the present invention is a client in a wireless communication system for communicating messages generated by a plurality of applications, some of the plurality of applications having an application identifier which can be associated with one of a plurality of codebooks for compressing and decompressing the messages. The client comprises a receiver for receiving selected ones of the plurality of codebooks and selected application identifiers from a server in preparation for communicating the messages, and a processing system coupled to the receiver for processing the messages. The processing system comprises a processor, and a memory coupled to the processor for storing the selected ones of the plurality of codebooks and the selected application identifiers. The processing system is programmed to, in response to receiving a message and the application identifier, identify, from the application identifier, an application to receive the message and, hence, a codebook associated with the application, to use for decompressing the message; and to process the message according to the codebook, to decompress the message.

DETAILED DESCRIPTION OF THE DRAWINGS

Figure 1:
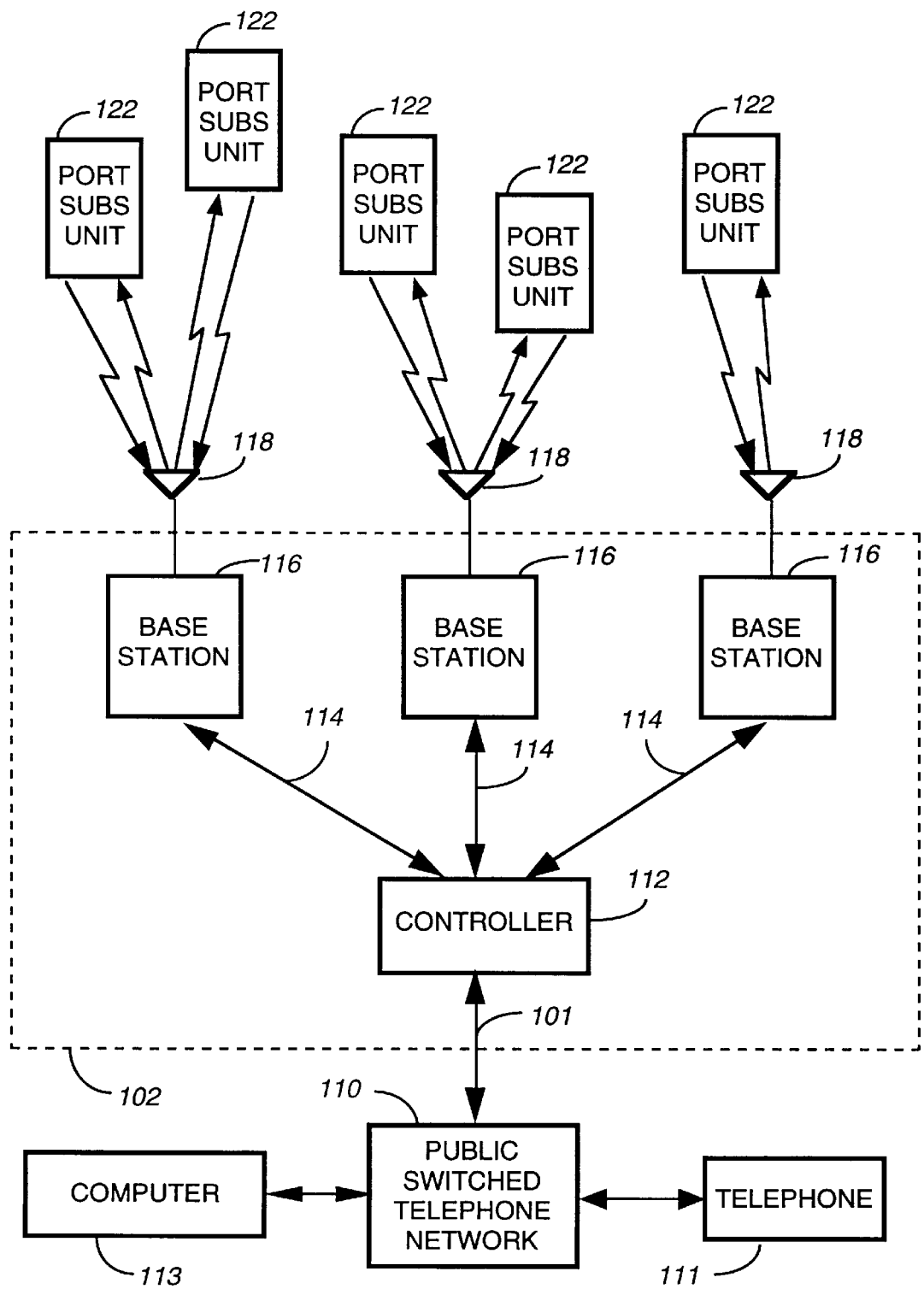
FIG. 1 is an electrical block diagram of an exemplary wireless messaging system in accordance with the present invention.

Referring to FIG. 1, an electrical block diagram of an exemplary wireless messaging system in accordance with the present invention comprises a fixed portion 102 including a controller 112 and a plurality of base stations 116, and a portable portion including a plurality of portable subscriber units 122, preferably having acknowledge-back capability. The base stations 116 preferably communicate with the portable subscriber units 122 utilizing conventional radio frequency (RF) techniques, and are coupled by communication links 114 to the controller 112, which controls the base stations 116.

The hardware of the controller 112 is preferably a combination of the Wireless Messaging Gateway (WMGTM) Administrator! paging terminal, and the RF-Conductor!™ message distributor manufactured by Motorola, Inc., and includes software modified in accordance with the present invention. The hardware of the base stations 116 is preferably a combination of the RF-Orchestra! transmitter and RF-Audience!™ receivers manufactured by Motorola, Inc. The portable subscriber units 122 are preferably similar to Pagewriter™ data messaging units, also manufactured by Motorola, Inc., and having software modified in accordance with the present invention. It will be appreciated that other similar hardware can be utilized as well for the controller 112, the base stations 116, and the portable subscriber units 122.

Each of the base stations 116 transmits RF signals to the portable subscriber units 122 via a transceiver antenna 118. The base stations 116 each receive RF signals from the plurality of portable subscriber units 122 via the transceiver antenna 118. The RF signals transmitted by the base stations 116 to the portable subscriber units 122 (outbound messages) comprise selective call addresses identifying the portable subscriber units 122, and voice and data messages originated by a caller, as well as commands originated by the controller 112 for adjusting operating parameters of the radio communication system. The RF signals transmitted by the portable subscriber units 122 to the base stations 116 (inbound messages) comprise responses that include scheduled messages, such as positive acknowledgments (ACKs) and negative acknowledgments (NAKs), and unscheduled messages, such as registration requests.

The controller 112 preferably is coupled by telephone links 101 to a public switched telephone network (PSTN) 110 for receiving selective call message originations therefrom. Selective call originations comprising voice and data messages from the PSTN 110 can be generated, for example, from a conventional telephone 111 or a conventional computer 113 coupled to the PSTN 110. It will be appreciated that, alternatively, other types of communication networks, e.g., packet switched networks and local area networks, can be utilized as well for transporting originated messages to the controller 112.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other suitable protocols can be used as well. It will be further appreciated that, with some limitations, the present invention can also be applied to a one-way wireless messaging system as well.

Figure 2:
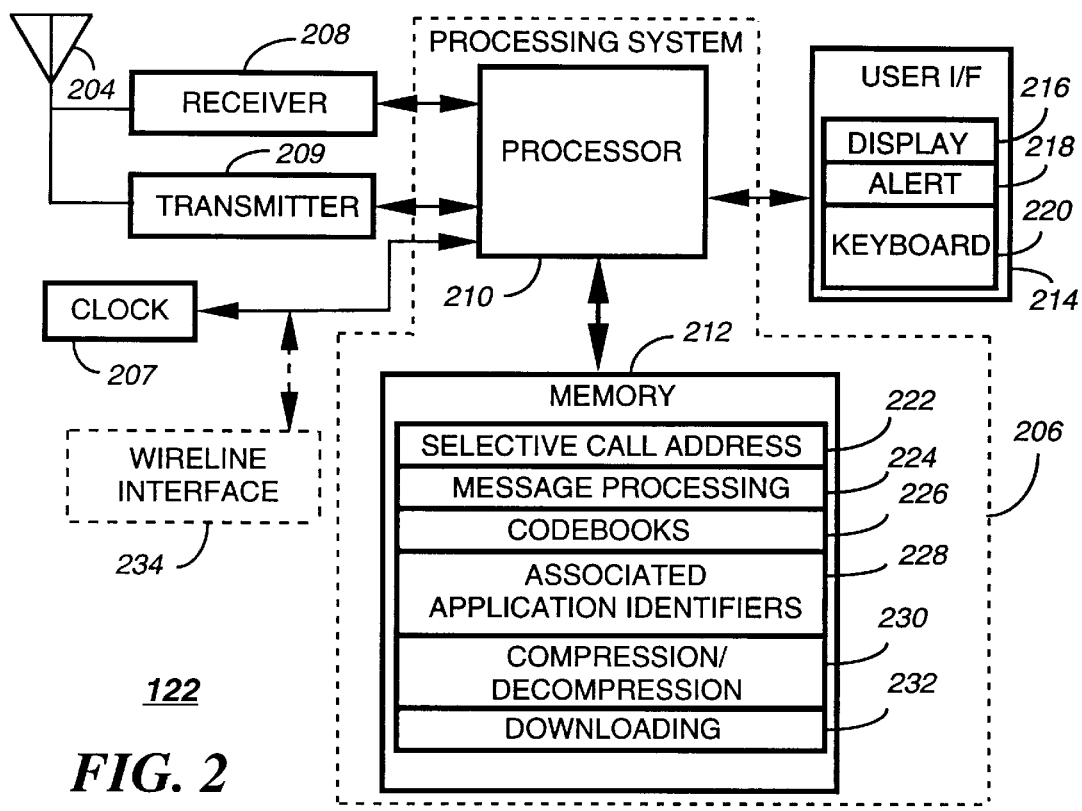
FIG. 2 is a electrical block diagram of an exemplary client in the form of a portable subscriber unit in accordance with the present invention.

FIG. 2 is an electrical block diagram of an exemplary client in the form of a portable subscriber unit 122 in accordance with the present invention. The portable subscriber unit 122 comprises an antenna 204 for intercepting an outbound message and for transmitting an inbound message. The antenna 204 is coupled to a conventional receiver 208 for receiving the outbound message and is also preferably coupled to a conventional transmitter 209 for transmitting the inbound message. The receiver 208 and the transmitter 209 are coupled to a processing system 206 for processing the outbound and inbound messages and for controlling the portable subscriber unit 122 in accordance with the present invention. A user interface 214 is also coupled to the processing system 206 for interfacing with a user. The user interface 214 comprises a conventional display 216 for displaying the inbound and outbound messages, a conventional alert element 218 for alerting the user when the outbound message arrives, and a conventional keyboard 220 for generating the inbound message and for controlling the portable subscriber unit 122. A conventional clock 207 is also coupled to the processing system 206 for supporting time keeping requirements in accordance with the present invention.

The processing system 206 comprises a conventional processor 210 and a conventional memory 212. The memory 212 comprises software elements and databases for programming the processing system 206 in accordance with the present invention. The memory 212 preferably includes a selective call address 222 to which the portable subscriber unit 122 is responsive. The memory 212 further comprises a message processing element 224 for processing a message in accordance with the present invention. The memory 212 also includes codebooks 226 utilized for compressing/decompressing messages from various applications, and associated application identifiers 228 for identifying applications associated with the codebooks 226. In addition, the memory 212 includes a compression/decompression element 230 for compressing and decompressing messages according to the codebooks 226 through conventional techniques. The memory 212 further comprises a downloading element 232 for cooperating with the controller 112 to download the codebooks 226 and the associated application identifiers 228 preferably wirelessly, or, alternatively, through a wired network via a conventional wireline interface 234, such as a modem, coupled to the processing system.

Figure 3:
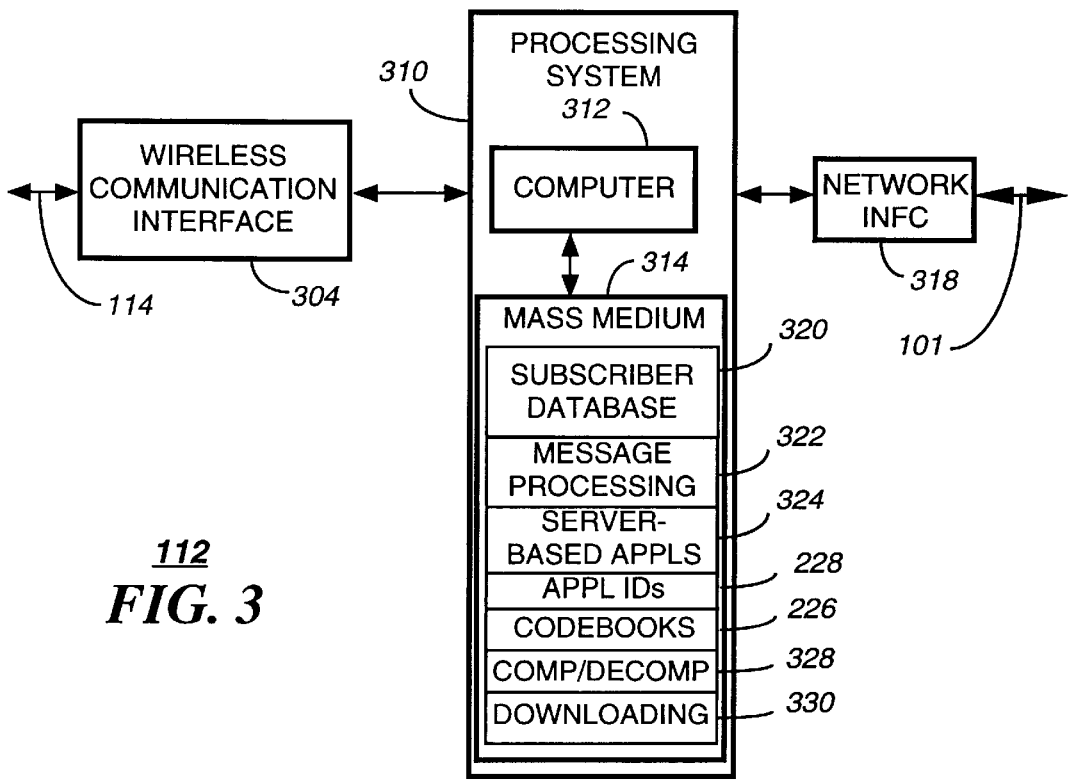
FIG. 3 is a electrical block diagram of an exemplary server in the form of a controller in accordance with the present invention.

FIG. 3 is an electrical block diagram of an exemplary server in the form of a controller 112 in accordance with the present invention. The controller 112 comprises a processing system 310 for executing the operations of the controller 112. The processing system 310 is coupled to a conventional network interface 318 for receiving messages through the telephone links 101. The processing system 310 is also coupled to a conventional wireless communication interface 304 for controlling and communicating with the base stations 116 through the communication links 114. It will be appreciated that more than one wireless communication interface 304 can be present, depending upon system size.

The processing system 310 comprises a conventional computer 312 and a storage element, preferably a conventional mass storage medium 314. The mass storage medium 314 includes, for example, a subscriber database 320, comprising subscriber information such as addressing and programming options of the portable subscriber units 122. The computer 312 is preferably programmed by way of software included in the mass storage medium 314 for providing the operations and features required in accordance with the present invention. The computer 312 preferably comprises a plurality of processors such as VME Sparc™ processors manufactured by Sun Microsystems, Inc. These processors include memory such as dynamic random access memory (DRAM), which serves as a temporary memory storage device for program execution, and scratch pad processing such as, for example, storing and queuing messages originated by callers using the PSTN 110, processing acknowledgments received from the portable subscriber units 122, and protocol processing of messages destined for the portable subscriber units 122. The mass storage medium 314 is preferably a conventional hard disk mass storage device. It will be appreciated that other types of conventional computers 312 can be utilized, and that additional computers 312 and mass storage media 314 of the same or alternative type can be added as required to handle the processing requirements of the processing system 310.

The mass storage medium 314 preferably includes software and various databases utilized in accordance with the present invention. The mass storage medium 314 preferably includes a message processing element 322 for processing messages in accordance with the present invention. The mass medium 314 also includes server based applications 324 and corresponding application identifiers 228. In addition, the mass medium 314 includes the codebooks 226 for compressing/decompressing messages in accordance with the present invention, as will be described further below. The mass medium 314 further comprises a compression/decompression element 328 for compressing and decompressing a message through conventional techniques according to the codebook 226 associated with the application 324 sending the message. In addition, the mass medium includes a downloading element 330 for cooperating with the portable subscriber unit 122 to download selected ones of the codebooks 226, along with selected ones of the application identifiers 228 to be associated with the codebooks 226, to the client, i.e., to the portable subscriber unit 122, in preparation for communicating messages. It will be appreciated that the server, i.e., the controller 112, preferably has a full set of the codebooks 226 and a full set of the associated application identifiers 228 used throughout the wireless messaging system, while a particular client preferably has only partial sets when the particular client intends to use only a fraction of the total number of applications available in the wireless messaging system. Preferably, the specific applications required by each client are identified in the subscriber database 320, so that the controller 112 can determine which codebooks and associated application identifiers to send to the client. It will be further appreciated that, while FIG. 3 depicts the controller 112 to be the server, the server can alternatively be a separate device outside of the controller 112 but coupled to the controller 112 for access to the wireless messaging system.

Figure 4:
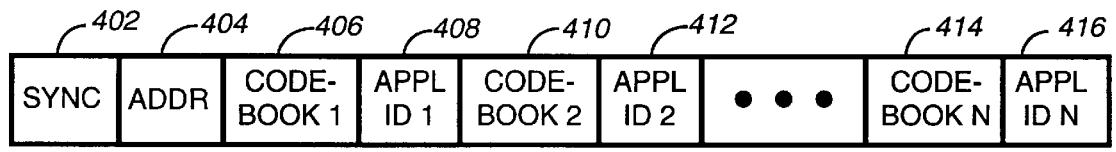
FIG. 4 is an exemplary protocol diagram depicting a structure suitable for sending codebooks and associated application identifiers from a server to a client in accordance with the present invention.

FIG. 4 is an exemplary protocol diagram 400 depicting a structure suitable for sending codebooks and associated application identifiers from the server to the client in accordance with the present invention. The diagram 400 comprises a synchronization portion 402 for synchronizing the client with the server using well-known techniques. The diagram 400 further comprises an address 404 for identifying the client for which the codebooks and associated application identifiers are intended. The address 404 is followed by at least one codebook 406, 410, 414 and at least one associated application identifier 408, 412, 416. It will be appreciated that the diagram 400 is simplified to depict elements germane to the present invention and that other elements can be present in a practical implementation.

Figure 5:
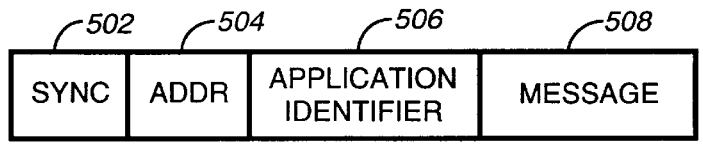
FIG. 5 is an exemplary protocol diagram depicting a structure suitable for sending a compressed message and an application identifier from the server to the client in accordance with the present invention.

FIG. 5 is an exemplary protocol diagram 500 depicting a structure suitable for sending a compressed message 508 and an application identifier 506 from a application to the client in accordance with the present invention. The diagram 500 comprises a synchronization portion 502 for synchronizing the client with the server using well-known techniques. The diagram 500 further comprises an address 504 for identifying the client for which the compressed message 508 and the application identifier 506 are intended. Again, it will be appreciated that the diagram 500 is simplified to depict elements germane to the present invention and that other elements can be present in a practical implementation. It will be further appreciated that the diagram 500 is also suitable for sending a compressed message 508 and an application identifier 506 from a client-based application to the server.

Figure 6:
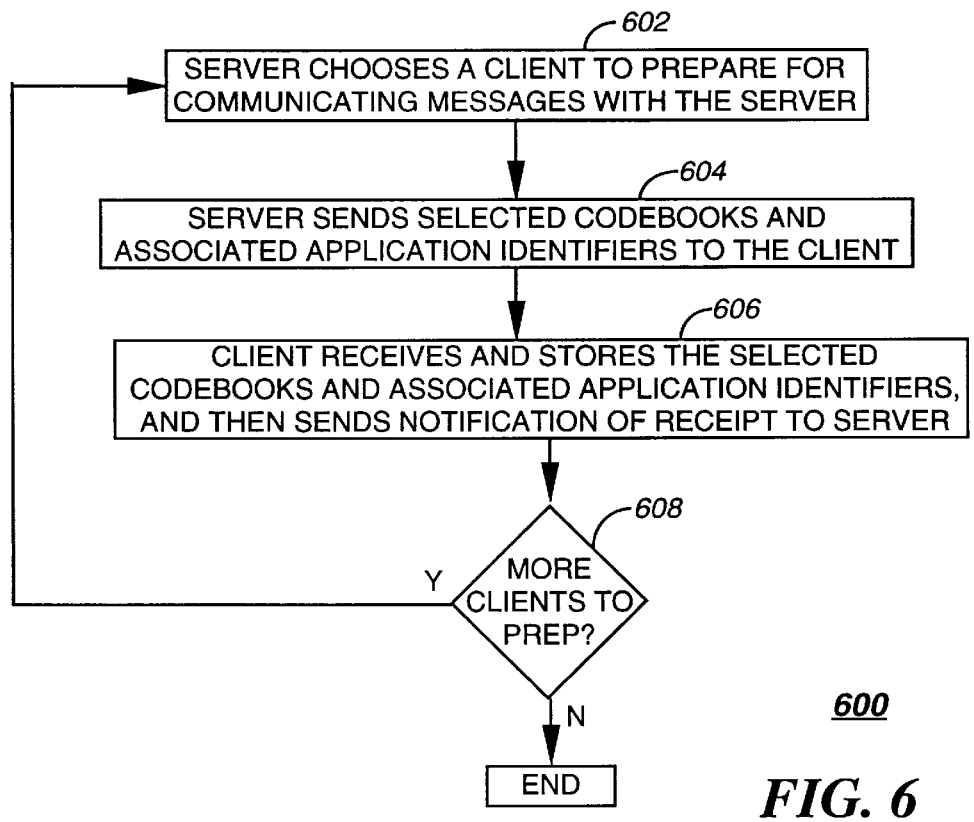
FIG. 6 is an exemplary flow diagram depicting operation of the server and the client while preparing to communicate messages in accordance with the present invention.

FIG. 6 is an exemplary flow diagram 600 depicting operation of the server and the client while preparing to communicate messages in accordance with the present invention. First, the server chooses 602 a client to prepare for communicating messages with the server. Preferably, this preparation is performed whenever a new client is added to the messaging system and whenever a change is made to the applications that an existing client intends to utilize. The server then selects the codebooks 226 and associated application identifiers 228 that are needed to prepare the client and sends 604, or downloads, the selected codebooks 226 and associated application identifiers 228 to the client. The client receives and stores 606 the selected codebooks 226 and associated application identifiers 228 in the memory 212 and then sends a notification of receipt to the server. Preferably, the process of downloading the selected codebooks 226 and associated application identifiers 228 from the server to the client is done wirelessly. It will be appreciated that, alternatively, the downloading process can be done through a wired network. The server then checks 608 whether there are additional clients to prepare for communicating messages. If so the flow returns to step 602 to choose a next client. If not, the process ends. It will be appreciated that to minimize the traffic resulting from downloading the codebooks 226 and application identifiers 228, it is preferred to download to each client only those codebooks 226 and application identifiers 228 associated with the applications that the subscriber database 320 indicates are utilized by the client. It will be further appreciated that, when feasible, multiple applications will utilize the same compression/decompression codebook 226. It also will be appreciated that the codebook(s) 226 and application identifier(s) 228 preferably are downloaded once to a given client, and that the messaging system subsequently utilizes the codebook(s) 226 and application identifier(s) 228 a plurality of times for communicating a plurality of messages to the client. In addition, it will be appreciated that after a codebook 226 has been communicated from the server to a client, the server can send a codebook update to the client. The codebook update preferably comprises a portion of the codebook 226 and an index describing where the portion is to be placed in the codebook 226. When the client receives the codebook update, the client stores the portion of the codebook 226 in accordance with the index, utilizing well-known techniques for indexing into a database.

Figure 7:
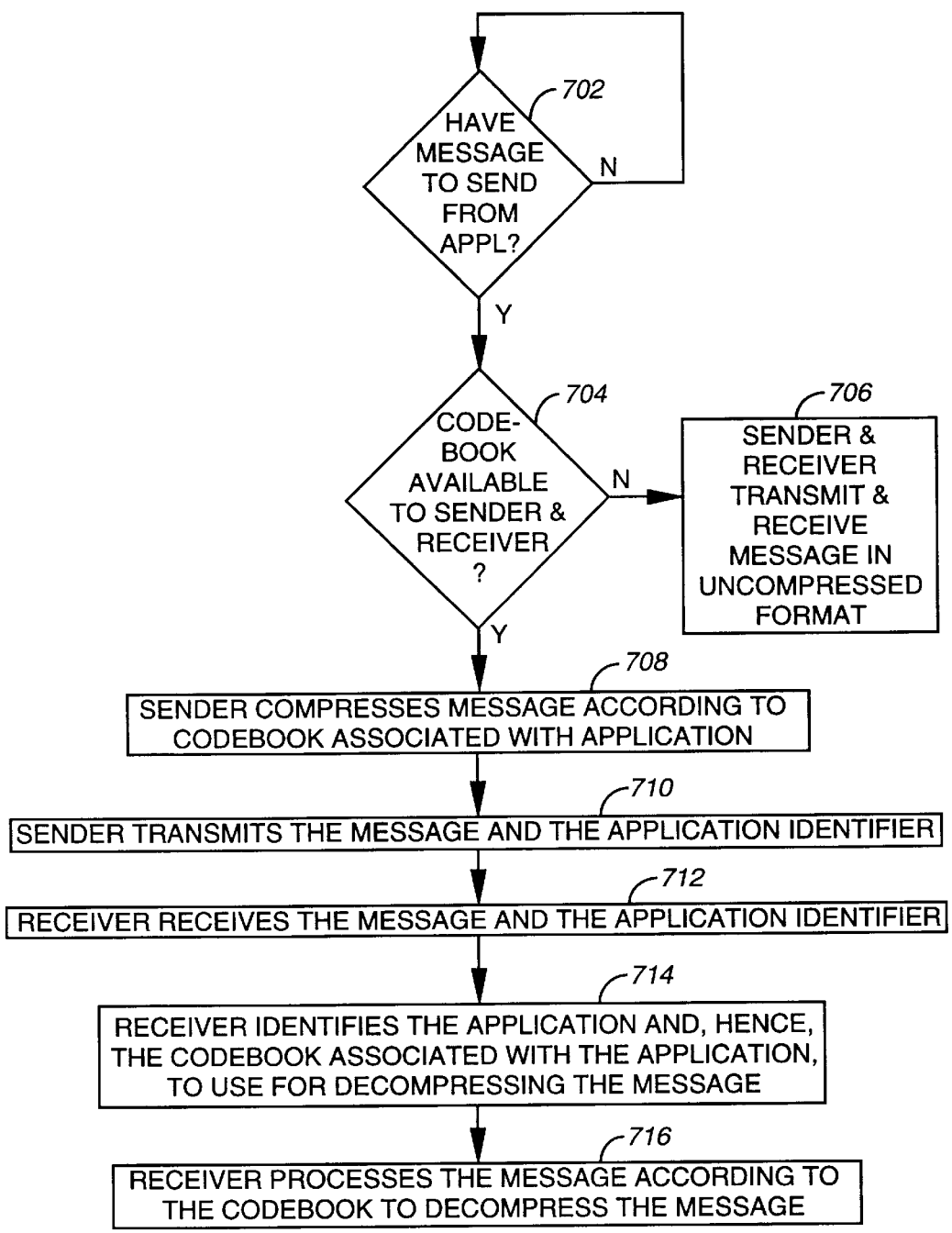
FIG. 7 is an exemplary flow diagram depicting operation of the server and the client while communicating messages in accordance with the present invention.

FIG. 7 is an exemplary flow diagram 700 depicting operation of the server and the client while communicating messages in accordance with the present invention. Note that the diagram 700 applies to both server-to-client messages and client-to-server messages; thus, the more generic terms "sender" and "receiver" are used in the diagram 700. At step 702 the sender checks repeatedly whether it has a message to send from an application to the receiver. When the sender has a message to send, the sender checks 704 whether a codebook 226 associated with the application generating the message is available to both the sender and the receiver. For a server-to-client message, the codebook 226 is assumed to be available if a subscriber database entry for the client indicates that the server has received a notification of receipt of the codebook 226 associated with the application and a confirmation of the association of the codebook 226 with the application. For a client-to-server message, the codebook 226 is assumed to be available if the client determines that a compression codebook 226 exists in the memory 212 for client-to-server transmissions corresponding to the application to be used for sending the message to the server. If in step 704 the codebook 226 is not available, the sender defers the activation of compression for data to the receiver, and the sender and the receiver respectively transmit and receive 706 the message in an uncompressed format.

If, however, in step 704 the codebook 226 is available, then the sender compresses 708 the message according to the codebook 226 associated with the application. The sender then transmits 710 the message and the application identifier 228. Next, the receiver receives 712 the compressed message and the application identifier 228. The receiver accesses the application identifiers 228 and the codebooks 226 stored within the receiver to determine that a decompression codebook exists within the receiver for the application identified by the application identifier 228. The receiver then identifies 714 the application and, hence, the codebook associated with the application, to use for decompressing the message. The receiver then processes 716 the message in accordance with the codebook 226 to decompress the message. It will be appreciated that for some applications the codebook 226 used for compressing/decompressing a server-to-client message can be the same as the codebook used for compressing/decompressing a client-to-server message, while for other applications the codebook 226 for a client-to-server message can be different from that for a server-to-client message.

Preferably, the steps of compressing the message, transmitting the message, receiving the message, identifying the codebook 226, and processing the message according to the codebook 226 occur multiple times for each unique combination of application and client that communicates with the application. Each unique combination of application and client that communicates with the application requires the downloading of at least the application identifier 228 and, usually, the codebook 226 associated with the application (unless the codebook 226 has already been downloaded to the client for another application that uses the same codebook). Thus, it is desirable to make use of the downloaded codebook multiple times for compression/decompression of messages, else the air time required for the download may be more than the air time saved by compressing/decompressing the messages.

Thus, it should be clear from the preceding disclosure that the present invention advantageously provides a method and apparatus in a wireless messaging system for supporting application-specific compression/decompression techniques without expending an unnecessarily large amount of air time in the process. The method and apparatus also advantageously limits the distribution of codebooks according to client needs.

Many modifications and variations of the present invention are possible in light of the above teachings. Thus, it is to be understood that, within the scope of the appended claims, the invention can be practiced other than as described herein above.

What is claimed is:

1. A method in a wireless communication system for communicating messages generated by a plurality of applications, some of the plurality of applications having an application identifier which can be associated with one of a plurality of codebooks for compressing and decompressing the messages, the method comprising:

in a server the step of sending selected ones of the plurality of codebooks, along with selected application identifiers to be associated with the plurality of codebooks, to a client in preparation for communicating the messages; and in the client the step of receiving and storing the selected ones of the plurality of codebooks and the selected application identifiers in preparation for communicating the messages, and the method subsequently comprising:

in the server, in response to having a message to send to the client, the steps of:
  compressing the message according to a codebook associated with an application generating the message; and
  transmitting, to the client, the message and the application identifier of the application; and in the client, in response to receiving the message and the application identifier, the steps of:
  identifying, from the application identifier, the application to receive the message and, hence, the codebook associated with the application, to use for decompressing the message; and
  processing the message according to the codebook, to decompress the message.

2. The method of claim 1, further comprising in the server the step of
  utilizing one of the plurality of codebooks for compressing and decompressing the messages generated by more than one of the plurality of applications.

3. The method of claim 1, wherein the sending step comprises the step of
  wirelessly downloading the selected ones of the plurality of codebooks and the selected application identifiers to the client.

4. The method of claim 1, wherein the sending step comprises the step of
  downloading the selected ones of the plurality of codebooks and the selected application identifiers to the client through a wired network.

5. The method of claim 1, further comprising in the client the step of
  communicating a notification of receipt to the server, in response to receiving the selected ones of the plurality of codebooks and the selected application identifiers.

6. The method of claim 1, further comprising in the server the step of
  deferring an activation of compression for data to the client until receiving from the client a notification of receipt of the selected ones of the plurality of codebooks and a confirmation of an association of a codebook with the application.

7. The method of claim 1,
  wherein the compressing, transmitting, identifying, and processing steps occur a plurality of times for each unique combination of application and client that communicates with the application.

8. The method of claim 1, further comprising in the client the steps of:
  preparing to send data associated with a particular application to the server;
  determining that a compression codebook exists for client-to-server transmissions corresponding to the particular application;
  compressing the data according to the compression codebook; and
  sending the data and the application identifier of the particular application to the server.

9. The method of claim 1, further comprising in the server the steps of:
  receiving data and the application identifier from the client;
  determining that an associated decompression codebook exists for the application identified by the application identifier; and
  decompressing the data according to the associated decompression codebook.

10. The method of claim 1,
  wherein the compressing step is performed according to a first compression codebook for a server-to-client message generated by a particular application, and
  wherein the method further comprises in the client the step of utilizing a second compression codebook different from the first compression codebook for compressing a client-to-server message.

11. The method of claim 1, further comprising, after communicating one of the plurality of codebooks from the server to the client:
  in the server the step of sending to the client a codebook update comprising a portion of the one of the plurality of codebooks and an index describing where the portion is to be placed in the codebook; and
  in the client the step of receiving the codebook update and storing the portion in the one of the plurality of codebooks in accordance with the index.

12. A server in a wireless communication system for communicating messages generated by a plurality of applications, some of the plurality of applications having an application identifier which can be associated with one of a plurality of codebooks for compressing and decompressing the messages, the server comprising:
  a processing system, comprising:
    a processor for processing the messages; and
    a storage element for storing the messages and further for storing the plurality of applications and the plurality of codebooks; and
  a wireless communication interface coupled to the processing system for communicating the messages to and from a client,
  wherein the processing system is programmed to send selected ones of the plurality of codebooks, along with selected application identifiers to be associated with the plurality of codebooks, to the client in preparation for communicating the messages, and
  wherein the processing system is further programmed, in response to having a message to send to the client, to:
    compress the message according to a codebook associated with an application generating the message; and
    transmit the message and the application identifier of the application to the client.

13. The server of claim 12, wherein the processing system is further programmed to utilize one of the plurality of codebooks for compressing and decompressing the messages generated by more than one of the plurality of applications.

14. The server of claim 12, wherein the processing system is further programmed to wirelessly download the selected ones of the plurality of codebooks and the selected application identifiers to the client.

15. The server of claim 12, wherein the processing system is further programmed to download the selected ones of the plurality of codebooks and the selected application identifiers to the client through a wired network.

16. The server of claim 12, wherein the processing system is further programmed to defer an activation of compression for data to the client until receiving from the client a notification of receipt of the selected ones of the plurality of codebooks and a confirmation of an association of a codebook with the application.

17. The server of claim 12, wherein the processing system is further programmed to:

receive data and the application identifier from the client;

determine that an associated decompression codebook exists for the application identified by the application identifier; and decompress the data according to the associated decompression codebook.

18. The server of claim 12, wherein the processing system is further programmed to:

compress a server-to-client message generated by a particular application according to a first compression codebook, and decompress a client-to-server message generated by the particular application according to a second compression codebook.

19. A client in a wireless communication system for communicating messages generated by a plurality of applications, some of the plurality of applications having an application identifier which can be associated with one of a plurality of codebooks for compressing and decompressing the messages, the client comprising:

a receiver for receiving selected ones of the plurality of codebooks, along with selected application identifiers from a server in preparation for communicating the messages;

a processing system coupled to the receiver for processing the messages, the processing system comprising:
a processor; and
a memory coupled to the processor for storing the selected ones of the plurality of codebooks and the selected application identifiers, wherein the processing system is programmed to:
in response to receiving a message and the application identifier, identify, from the application identifier, an application to receive the message and, hence, a codebook associated with the application, to use for decompressing the message; and
process the message according to the codebook, to decompress the message.

20. The client of claim 19, wherein the processing system is further programmed to communicate a notification of receipt to the server, in response to receiving the selected ones of the plurality of codebooks and the selected application identifiers.

21. The client of claim 19, wherein the processing system is further programmed to:

prepare to send data associated with a particular application to the server;

determine that a compression codebook exists for client-to-server transmissions corresponding to the particular application;

compress the data according to the compression codebook; and send the data and the application identifier of the particular application to the server.

* * * * *